United States Patent [19]

Bills, Jr.

[11] Patent Number: 4,568,235
[45] Date of Patent: Feb. 4, 1986

[54] LOW ANGLE TILT TRAILER

[75] Inventor: Joseph W. Bills, Jr., Mitchell, S. Dak.

[73] Assignee: Dakota Manufacturing Co., Inc., Mitchell, S. Dak.

[21] Appl. No.: 681,284

[22] Filed: Dec. 13, 1984

[51] Int. Cl.⁴ .............................................. B60P 1/18
[52] U.S. Cl. .................................. 414/477; 280/80 B; 280/656; 414/482
[58] Field of Search ........ 414/469, 474, 475, 477–480, 414/482–485; 280/80 B, 656

[56] References Cited

U.S. PATENT DOCUMENTS

| 2,657,939 | 11/1953 | Beebe | 280/656 X |
|---|---|---|---|
| 2,717,707 | 9/1955 | Martin | 414/475 |
| 3,685,853 | 8/1972 | Goldsmith | 280/656 X |
| 3,934,740 | 1/1976 | Rumell | 414/484 |
| 4,046,274 | 9/1977 | Libersky | 414/485 |
| 4,125,198 | 11/1978 | Landoll | 414/484 |
| 4,130,211 | 12/1978 | Abascal | 414/483 X |
| 4,222,698 | 9/1980 | Boelter | 414/485 X |

Primary Examiner—Joseph E. Valenza
Assistant Examiner—David A. Bucci
Attorney, Agent, or Firm—Zarley, McKee, Thomte, Voorhees & Sease

[57] ABSTRACT

A low-angle tilt trailer comprising a forward frame section which is adapted to be connected to a prime mover and having a rear frame section selectively longitudinally slidably mounted thereon. A wheel assembly is mounted at the rearward end of the rear frame section. A hydraulic cylinder interconnects the forward frame section and the rear frame section to enable the rear frame section and the wheel assembly mounted thereon to be moved between rearward and forward positions relative to the front prime section. The trailer bed is pivotally connected to the rear frame section to enable the trailer bed to be tilted so that the rearward end of the trailer bed can be brought into ground engagement. The rear frame section may be moved forwardly relative to the front frame section and the trailer bed tilted upwardly to approximately an 8½° angle to facilitate the loading and unloading of equipment.

5 Claims, 12 Drawing Figures

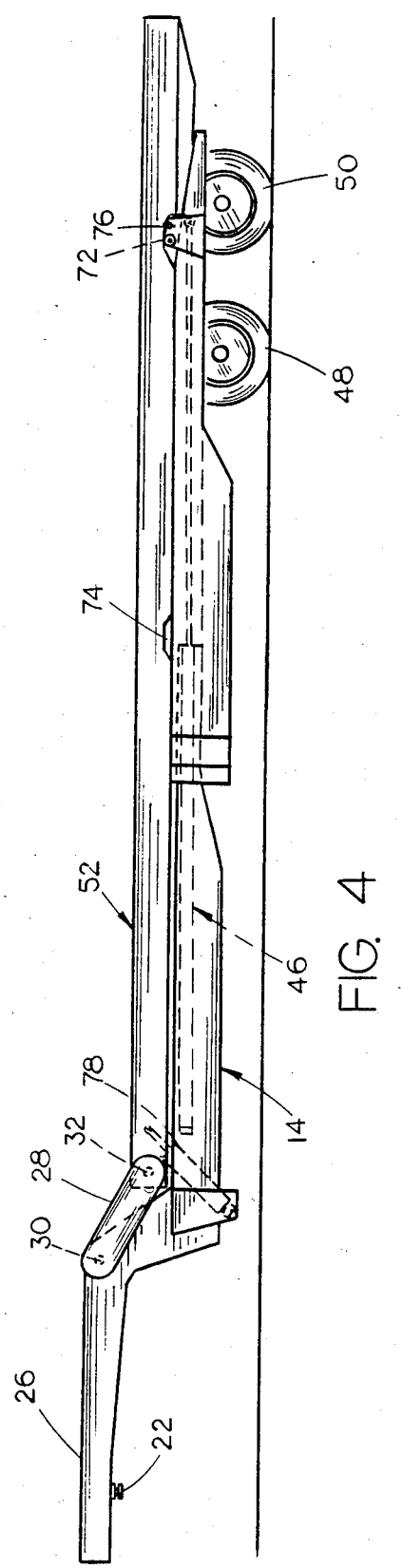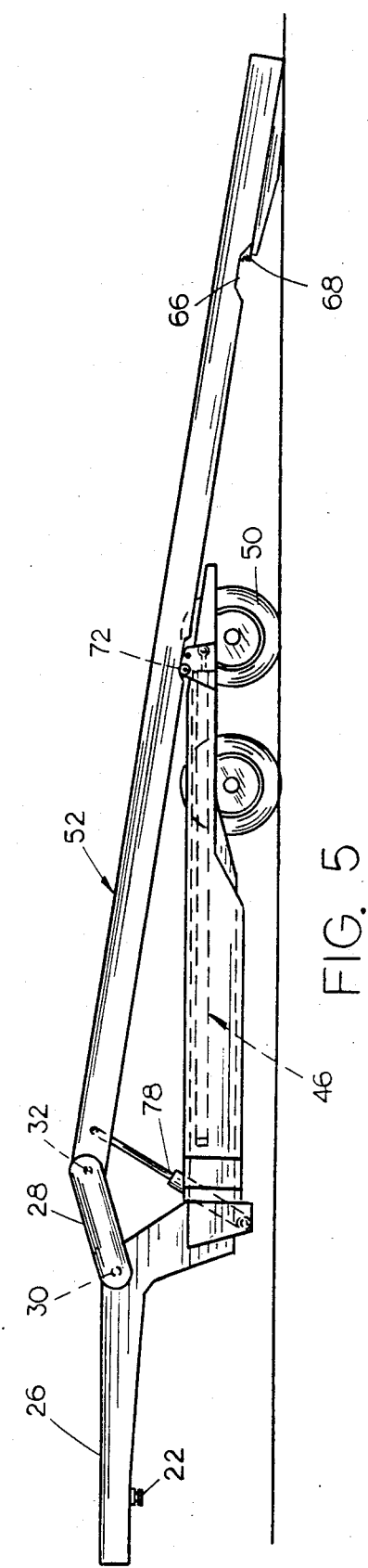

LOW ANGLE TILT TRAILER

BACKGROUND OF THE INVENTION

This invention relates to an equipment trailer and more particularly to a full-tilt, low-angle equipment trailer designed to transport large equipment such as pavers, semimounted equipment, buses, trucks, rollers, sweepers, trenchers, etc.

Many types of trailers have been previously provided for transporting large equipment over the road. The equipment is normally loaded onto the trailer from the rearward end thereof. Folding ramps or the like have sometimes been provided at the rear ends of the trailers to enable the equipment to move onto the trailer bed. In some cases, the bed of the trailer is tilted to move the rearward end thereof into close proximity to the ground to enable the equipment to move or be moved onto the trailer. A problem associated with both the folding ramp design and the tilting trailer bed is that the angle of the same is quite large thereby making it difficult, if not impossible, for the equipment to be loaded onto the trailer.

Therefore, it is a principal object of the invention to provide a low-angle tilt trailer.

A further object of the invention is to provide a tilt trailer for carrying large pieces of equipment wherein the rear wheels of the trailer may be moved forwardly relative to the trailer bed for loading and unloading purposes.

Yet another object of the invention is to provide a tilt trailer which has approximately an $8\frac{1}{2}°$ angle of incline.

Yet another object of the invention is to provide a low-angle tilt trailer including an upper deck portion which may be loaded without lowering the rearward end of the trailer to the ground.

Still another object of the invention is to provide a low-angle tilt trailer wherein the rear axle assembly is secured directly to the main frame thereby assuring better alignment and tire maintenance.

Still another object of the invention is to provide a low-angle tilt trailer including longitudinally movable rear wheels which may be selectively moved to accommodate various load concentrations.

Yet another object of the invention is to provide a low-angle tilt trailer which is durable in use.

These and other objects will be apparent to those skilled in the art.

BRIEF DESCRIPTION OF THE DRAWINGS

FIG. 4 is a side view illustrating the wheels in their rearward position and the trailer in its transport position;

FIG. 5 is a view similar to that of FIG. 4 except that the wheels have been moved forwardly and the trailer has been moved to its tilt position;

SUMMARY OF THE INVENTION

Figure 2:
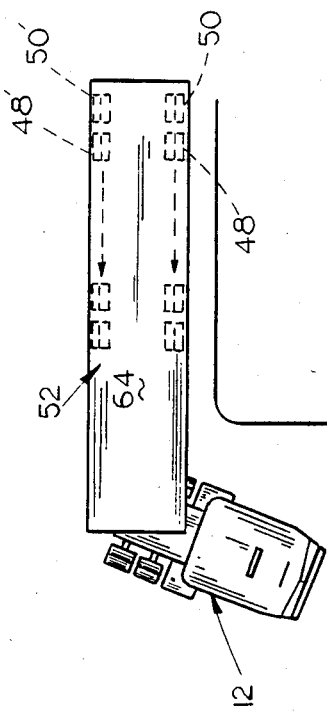
FIG. 2 is a top plan view illustrating the manner in which the wheels of the trailer may be moved forwardly.
Figure 1:
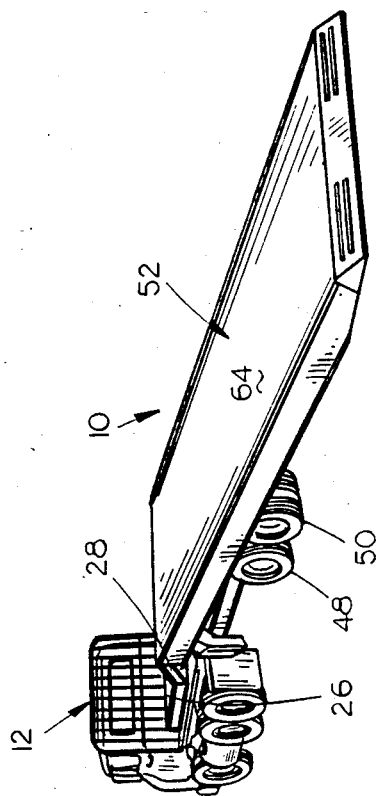
FIG. 1 is a rear perspective view of the trailer of this invention in the tilted position.

A low-angle tilt trailer designed to enable equipment to be easily loaded onto the trailer bed from the rearward end thereof is described. The trailer includes a forward frame section, the forward end of which is adapted to be connected to the prime mover. A rear frame section is selectively longitudinally slidably mounted on the forward frame section and has a wheel assembly mounted at the rearward end thereof. A large hydraulic cylinder interconnects the front frame section and the rear frame section to enable the rear frame section and the wheel assembly connected thereto to be moved between rearward and forward positions. A trailer bed or support deck is pivotally connected to the rear frame section to enable the trailer bed to be tilted so that the rearward end of the trailer bed can be brought into close proximity to the ground. When it is desired to load equipment onto the trailer, the rear frame section is moved forwardly relative to the front frame section and the trailer bed is then tilted to approximately an $8\frac{1}{2}°$ angle which lowers the rearward end of the trailer bed into ground engagement.

DESCRIPTION OF THE PREFERRED EMBODIMENT

The trailer of this invention is referred to generally by the reference numeral 10 and is designed to be pulled by a conventional truck 12 having a fifth-wheel trailer connection at its rearward end. Trailer 10 includes a front or fixed frame portion 14 comprised of a pair of longitudinally extending and horizontally spaced-apart frames 16 and 18. An upper deck frame 20 extends upwardly and forwardly from the forward ends of frames 16 and 18 and includes a king pin mechanism 22 at its forward end for connection to the fifth wheel of the truck. A plurality of transversely extending frame members 24 are secured to upper deck portion 20 and have a deck 26 extending thereover. A hinged deck slop 28 is pivotally connected at its forward end at 30 to the upper deck portion 20 and extends rearwardly therefrom. The rearward end of deck slope 28 is pivotally connected at 32 to the forward end of a trailer bed or support deck 52, the details of which will be described in greater detail hereinafter.

Figure 3:
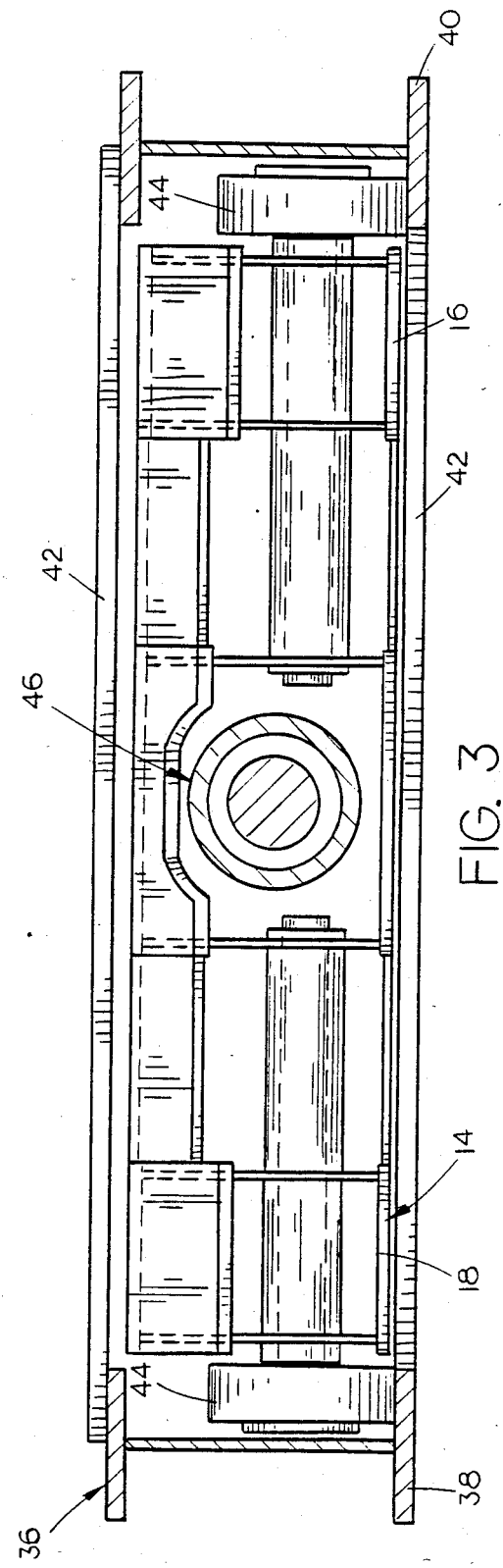
FIG. 3 is a transverse sectional view taken through the frame of the trailer.
Figure 6:
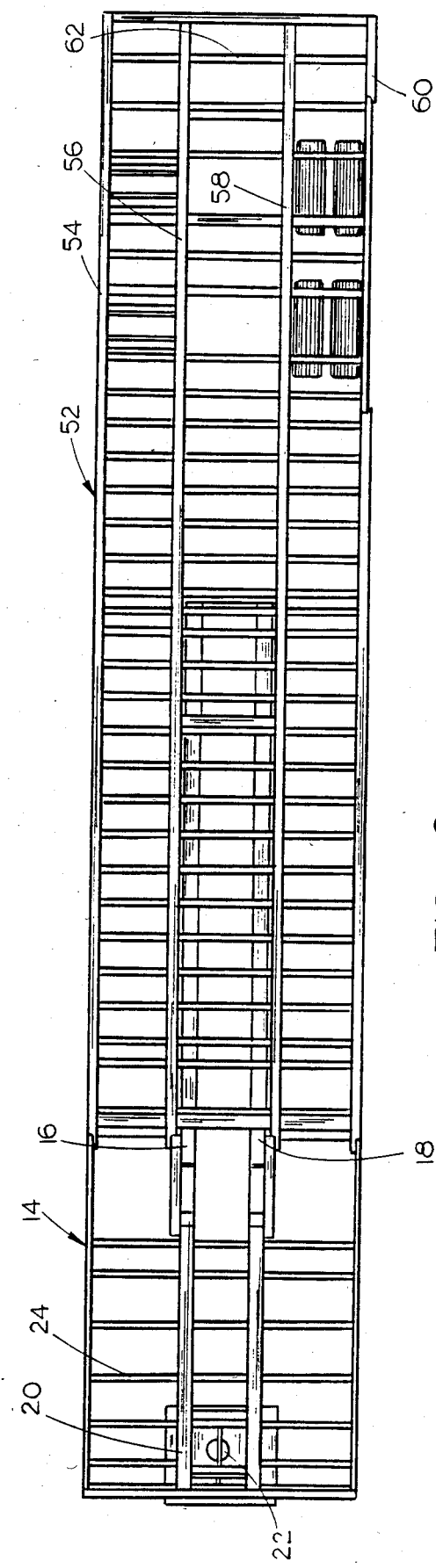
FIG. 6 is a top view of the trailer frame with the upper deck removed therefrom to more fully illustrate the invention.
Figure 7:
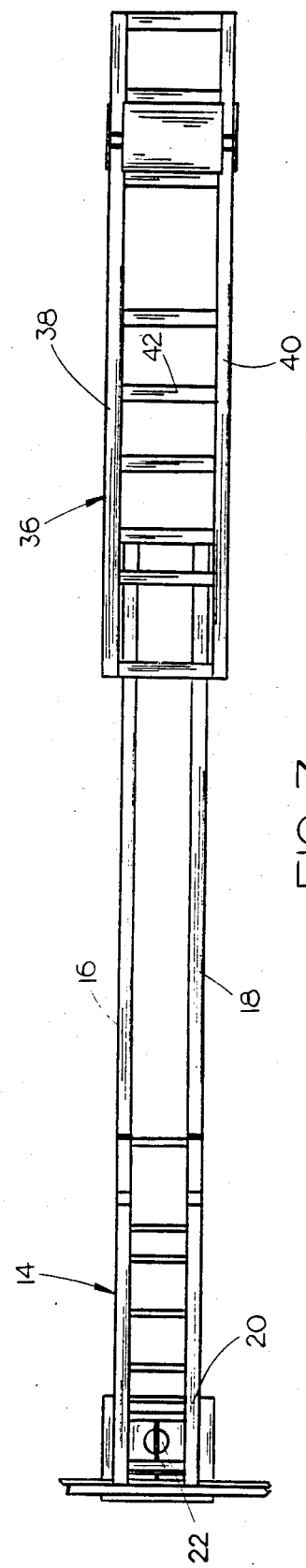
FIG. 7 is a top view of the center portion of the frame of the trailer.
Figure 8:
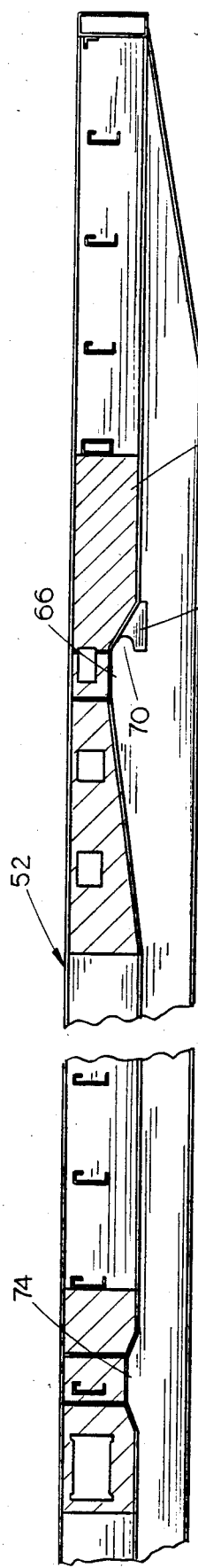
FIG. 8 is a partial longitudinal sectional view illustrating the lock housing on the deck support frame.
Figure 9:
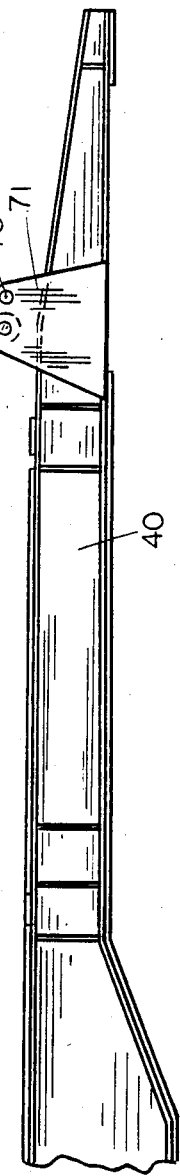
FIG. 9 is a longitudinal sectional view of the rear frame portion.
Figure 10:
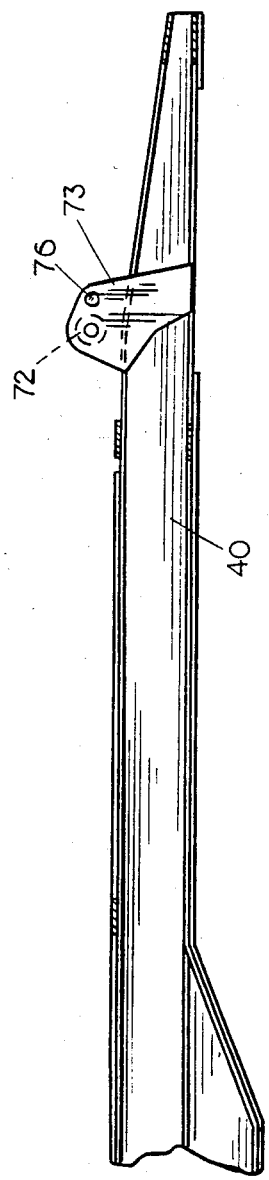
FIG. 10 is a longitudinal sectional view similar to FIG. 9.
Figure 11:
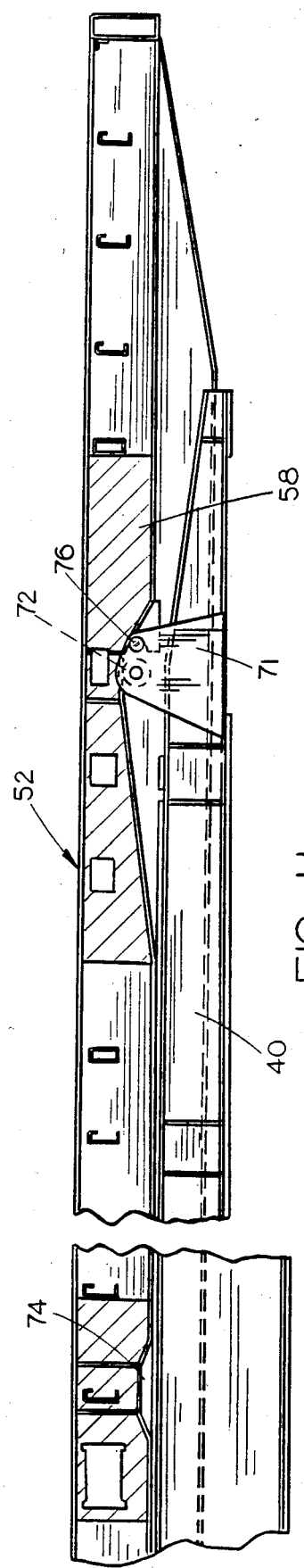
FIG. 11 is a partial longitudinal sectional view of the rear frame and support deck frame in a locked position.
Figure 12:
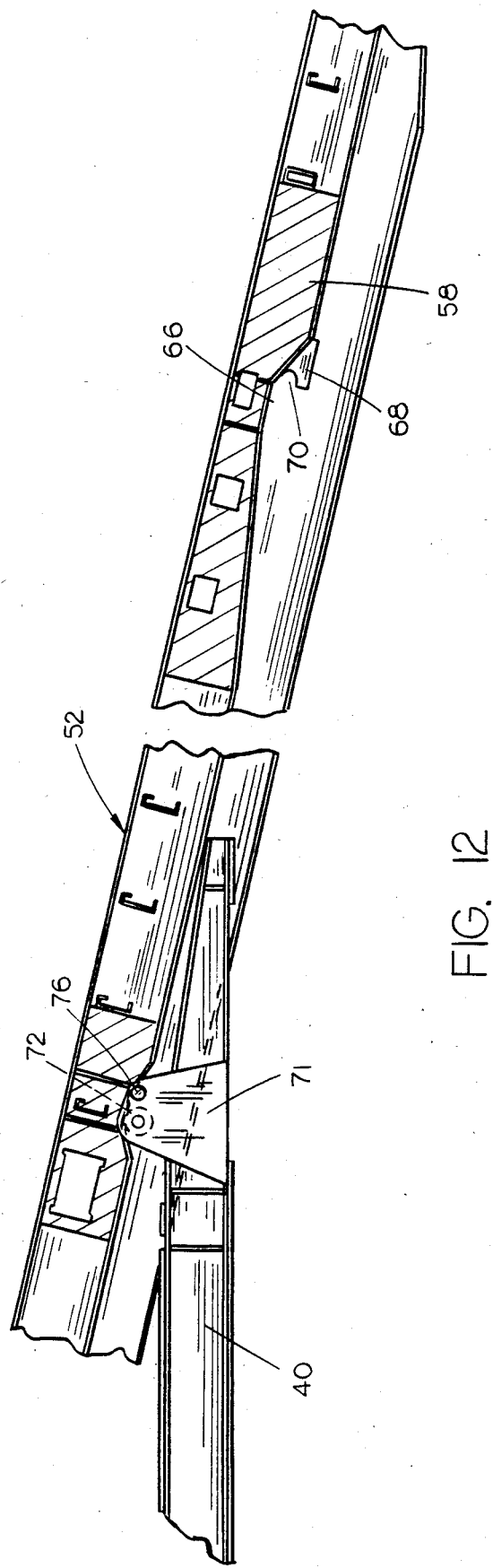
FIG. 12 is a view similar to FIG. 11 illustrating the support deck in its titled position.

Rear frame section 36 is longitudinally slidably mounted on the frame means 14 and includes a pair of spaced-apart frame members of the I-beam type referred to generally by the reference numerals 38 and 40. Reinforcing straps or braces 42 are secured to and extend between the frame members 38 and 40 along the length thereof at both the upper and lower portions of the frame members 38 and 40. As seen in FIG. 3, front frame section 14 has a plurality of rollers 44 mounted thereon which roll upon the lower inner flanges of frame members 38 and 40. Hydraulic cylinder 46 is secured to and extends between the frame sections 14 and 36 so that rear frame section 36 may be moved relative to front frame section 14. A suspension system (not shown) mounts dual axles to the rear frame section 36 so that a pair of dual wheels 48 and 50 are provided at one side of frame section 36 and so that a pair of dual wheels 48' and 50' are provided at the other side of frame section 36.

As seen in the drawings, support deck 52 is positioned over and extends across rear frame section 36 and front frame section 14. Support deck 52 includes longitudinally extending frame members 54, 56, 58 and 60 which are interconnected by cross frame members 62. Deck material or surface 64 is secured to the frame members 54, 56, 58 and 60 to provide a support surface for the equipment being transported.

As seen in the drawings, each of the frame members 56 and 58 of support deck 52 is provided with a tilt deck recess 66 formed therein which extends upwardly thereinto and which has a lock housing 68 provided at the rearward end thereof. Lock housing 68 is provided with a forwardly extending recess 70. Plates 71 and 73 are secured to opposite sides of each of frame members 38 and 40 and extend upwardly therefrom. A traveling roller 72 is rotatably mounted on each pair of the plates 71 and 73 which roll along the underside of the frame members 56 and 58 as illustrated in the drawings and which are adapted to be received by the tilt deck recesses 66 when the rear frame section 36 is fully extended and which is designed to be received by the recesses 74 when the rear frame section has been moved completely forward with respect to the front frame section 14. A lock pin 76 is also provided on each pair of the plates 71 and 73 and is adapted to be received by the recessed portion 70 in lock housing 68 when the rear frame section is in its rearwardmost position. When in such a position, the lock pin 76, by being received in the recess 70, prevents the rearward end of the support deck from moving upwardly relative to the frame means 36. At least one hydraulic cylinder 78 is secured to frame means 14 and the support deck 52 to cause the pivotal movement of the support deck relative to the slidable frames.

The normal method of operation is as follows. Assuming that the rear frame section 36 is in its rearwardmost position, lock pins 76 will be positioned in the recessed portions 70 of lock housings 68 and rollers 72 will be received by the tilt deck recesses 66 as previously described. When it is desired to load equipment onto the trailer, hydraulic cylinder 78 is actuated to extend the rod therefrom which causes the forward end of the support deck 52 to pivotally move upwardly. Upward movement of the forward end of the support deck 52 also causes the support deck 52 to slightly move rearwardly due to the hinged deck slope 28 providing the pivotal connection to the upper deck. The slight rearward movement of the deck portion 34 causes the lock housings 68 to move rearwardly relative to the lock pins 76. Hydraulic cylinder 46 is then retracted to cause the rear frame section 36 to move forwardly relative to the front frame section 14. Movement of the rear frame section 34 forwardly with respect to front frame section 14 causes the wheels of the trailer to move forwardly from their normal rear position to a forward position until the rollers 72 are received by the recesses 74. The cylinder 78 is then completely extended if it has not already been done. Extension of the cylinder 78 and retraction of the cylinder 46 causes the lower end of the trailer to be lowered into ground engagement so that the large equipment may be mounted thereon. It can be seen that by moving the wheels of the trailer forwardly from the rear position causes the pivot point to be moved forwardly so that the lower end of the trailer is brought into ground engagement while the deck is at a fairly low angle.

FIG. 2 illustrates another advantage of the ability to move the wheels forwardly in that the wheels can be moved forwardly should the truck encounter a sharp corner. Movement of the wheels forwardly from the rear position to the front position as illustrated in FIG. 2 substantially reduces the turning radius of the trailer. The longitudinal adjustment of the wheels of the trailer also permits the axle to be adjusted to accommodate concentrated loads on the trailer. The fact that the main deck may be pivotally moved relative to the front deck enables the upper deck to be conveniently loaded. A further feature of this invention is that the suspension system is attached directly to the main or rear trailer frame which ensures better alignment and tire maintenance. Further, when the deck is raised for loading and unloading, all of the wheels remain on the ground providing greater support and stability during the loading and unloading process. When the deck is in its fully tilted position, a load angle of approximately $8\frac{1}{2}°$ is achieved thereby permitting fast and easy loading of even the most difficult equipment.

Thus it can be seen that the invention accomplishes at least all of its stated objectives.

I claim:

1. A low angle tilt trailer, comprising, a first longitudinally extending frame means having rearward and forward ends, means on the forward end of said first frame means for connection to a prime mover, a second longitudinally extending frame means having rearward and forward ends, said second frame means being longitudinally slidably mounted on said first frame means and being movable between a rear position and a front position with respect to said first frame means, a ground engaging suspension system secured to and longitudinally movable with said second frame means for supporting said second frame means, a first hydraulic cylinder means secured to and extending between said first and second frame means for moving said second frame means between said rear and front positions, a support deck, having rearward and forward ends, pivotally mounted on said second frame means and being movable between a generally horizontal position and an inclined position wherein its rearward end is positioned closely to the ground, a second hydraulic cylinder means secured to said support deck for pivotally moving said deck between its horizontal and inclined positions, said second frame means normally being positioned in its said rear position during normal over-the-road travel, said second frame means being movable to its said front position, during loading and unloading operations, so that the pivot point between said deck and said second frame means will be positioned forwardly of its normal position to enable the rearward end of said deck to be brought into ground engagement while maintaining the deck at a relatively low angle.

2. The trailer of claim 1 wherein said front frame means includes an upper deck portion, having rearward and forward ends, which dwells in a plane above said deck when said deck is in its horizontal position, and a deck slope portion pivotally secured to and extending between the rearward end of said upper deck portion and the forward end of said support deck.

3. The trailer of claim 1 wherein said support deck and said second frame means have a cooperating lock means for limiting the upward movement of said support deck when said support deck is in its horizontal position and said second frame means is in its said rear position.

4. The trailer of claim 1 wherein a traveling roller means is provided on the rearward end of said second frame means which engages and supports said support deck.

5. The trailer of claim 4 wherein said support deck has an underside and has at least one upwardly extending recess formed therein which is adapted to receive said trailing roller means when said second frame means is in its rear position, a lock housing in said recess, and a lock pin on said second frame means which is received by said lock housing when said second frame means is in its rear position to limit the upward movement of said support deck when said support deck is in its horizontal position and said second frame means is in its rear position.

* * * * *